United States Patent [19]

Ekart et al.

[11] Patent Number: 5,635,584
[45] Date of Patent: Jun. 3, 1997

[54] PROCESS INCLUDING GLYCOLYSIS AND SUBSEQUENT PURIFICATION FOR RECYCLING POLYESTER MATERIALS

[75] Inventors: Michael P. Ekart; Thomas M. Pell, Jr., both of Kingsport, Tenn.

[73] Assignee: Eastman Chemical Company, Kingsport, Tenn.

[21] Appl. No.: 570,177

[22] Filed: Dec. 7, 1995

[51] Int. Cl.$^6$ .................................................. C08G 63/00
[52] U.S. Cl. ........................... 528/271; 521/40; 521/48; 528/176; 528/192; 528/193; 528/194; 528/272
[58] Field of Search ............................. 528/176, 192, 528/193, 194, 271, 272; 521/40, 48

[56] References Cited

U.S. PATENT DOCUMENTS

| | | | |
|---|---|---|---|
| 3,257,335 | 6/1966 | Whitfield et al. | 521/40 |
| 3,305,495 | 2/1967 | Orde | 521/40 |
| 3,577,454 | 5/1971 | Keck | 264/102 |
| 3,663,600 | 5/1972 | McConnell et al. | 521/48 |
| 3,703,488 | 11/1972 | Morton | 521/48 |
| 3,803,003 | 4/1974 | Matsuzawa et al. | 521/40 |
| 4,609,680 | 9/1986 | Fujita et al. | 521/48 |
| 5,225,130 | 7/1993 | Deiringer | 521/40 |
| 5,266,601 | 11/1993 | Kyber et al. | 521/48 |
| 5,298,530 | 3/1994 | Gamble et al. | 521/48 |
| 5,420,166 | 5/1995 | Tufts et al. | 521/40 |

OTHER PUBLICATIONS

Incorporating Postconsumer Recycled Poly(ethylene terephthalate), Richard et al., ACS Symposium Series, 513, 196 (1992).

*Primary Examiner*—Terressa Mosley
*Attorney, Agent, or Firm*—Charles R. Martin; Harry J. Gwinnell

[57] ABSTRACT

A new process is described for recycling polyesters. In accordance with the described process, postconsumer or scrap polyester is reacted with glycol to produce a monomer or low molecular weight oligomer by depolymerization of the polyester. The monomer or oligomer, as the case may be, is then purified using one or more of a number of steps including filtration, crystallization, and optionally adsorbent treatment or evaporation. The monomer or oligomer thus produced is particularly suitable as a raw material for acid or ester based polyester production of packaging grade polyester material. Because the process includes purification steps, specifications for the previously used polyester material need not be strict.

8 Claims, No Drawings

PROCESS INCLUDING GLYCOLYSIS AND SUBSEQUENT PURIFICATION FOR RECYCLING POLYESTER MATERIALS

FIELD OF THE INVENTION

The present invention is directed to a novel process including glycolysis and subsequent purification for recycling previously used polyester materials. In particular, the invention provides a process whereby previously used polyester materials, including either or both of scrap polyester materials and postconsumer polyester materials, may be conveniently and efficiently recycled and purified using glycolysis to depolymerize the previously used polyester materials, dissolution of the depolymerized materials, purification of the solution containing the depolymerized materials and subsequent precipitation of the depolymerized materials for reuse as raw material (or precursor) for polyester packaging materials.

BACKGROUND OF THE INVENTION

Concern for the environment has led to a demand for packaging materials that are at least partially composed of postconsumer materials. As a result, polyester materials are widely recycled. However, the stream of postconsumer polyester material is of highly variable composition and level of contamination, making it difficult to reprocess such material to the high level of quality required for use in the packaging industry. Typical variations in the compositional makeup of postconsumer materials include variations in the levels of comonomers in the polyester material, variations in the color of the polyester material, variations in the level of residual catalyst substances remaining in the polyester material, and variations in the amount of contamination introduced into the polyester material prior to recycling. For example, a previous user may have stored a pesticide in a container formed from a polyester material, thereby contaminating the polyester material which is subsequently to be recycled.

Several chemical treatment techniques are known for facilitating the recycling of polyester material. Such techniques are used to depolymerize polyester material to be recycled, whereby the polyester material is reduced to monomeric and/or oligomeric components. The monomeric and/or oligomeric components may then be purified and subsequently repolymerized to produce recycled polyester material. For example, such techniques may be used to facilitate the recycling of poly(ethylene terephthalate) (hereinafter referred to as "PET"); however, it should be apparent to the routineer in the related arts that these same techniques are applicable to other polyester materials which are desirably to be recycled.

One known technique is to subject PET to methanolysis. In accordance with the methanolysis technique, PET is reacted with methanol to produce dimethyl terephthalate (DMT) and ethylene glycol (EG). The DMT and EG may be readily purified and thereafter used to produce PET containing recycled polyester material. However, most conventional commercial PET production facilities throughout the world are designed to use either terephthalic acid (TPA) or DMT, but not both, as the monomeric raw material. Thus, additional processing would be required to convert the DMT into the TPA needed as a raw material for many such facilities.

Another known technique is hydrolysis, whereby PET is reacted with water to depolymerize the PET into TPA and EG. However, it is known that certain types of contaminants generally present in recycled PET are very difficult and expensive to remove from TPA. Moreover, for those facilities designed to use DMT as a raw material, the TPA would need to be converted into DMT.

Glycolysis may also be used for depolymerizing PET. Glycolysis occurs when PET is reacted with EG, thus producing bis-(2-hydroxyethyl) terephthalate (BHET) and/or its oligomers. Glycolysis has some significant advantages over either methanolysis or hydrolysis, primarily because BHET may be used as a raw material for either a DMT-based or a TPA--based PET production process without major modification of the production facility. Another significant advantage provided by the glycolysis technique is that the removal of glycol from the depolymerization solvent is not necessary. In this connection it is to be noted that the co-produced glycol must be separated from the water in the hydrolysis process or from the methanol in the methanolysis process.

A previous shortcoming of the glycolysis technique is that BHET produced from previously used polyester can not generally be purified using conventional procedures. For example, when BHET is subjected to vacuum distillation, polymerization thereof will generally occur. Moreover, in the past, glycolysis processes for reclaiming PET depended upon strict feed specifications and/or costly processing of PET flake prior to glycolysis because the previously known processes were unable to prevent significant levels of some types of contaminants from being present in the glycolysis product. These problems are discussed by Richard et al., for example, in their article entitled *Incorporating Postconsumer Recycled Poly(ethylene terephthalate)* which appeared in ACS Symposium Series, 513, 196 (1992). Thus, there clearly remains a need in the art for a glycolysis process that can handle low-quality postconsumer PET.

SUMMARY OF THE INVENTION

To satisfy the foregoing needs and solve many of the problems presently inherent in the recycling field, the present invention provides a novel process for purifying previously used polyester materials to be recycled. The process of the invention comprises contacting previously used polyester materials to be recycled with a suitable dihydric alcohol under glycolysis conditions to thereby depolymerize the polyester materials and produce monomeric, oligomeric or a mixture of monomeric and oligomeric dihydroxy species therefrom. The species thus produced are then dissolved in a hot solvent therefor to present a hot solution containing said species. The hot solution is then treated to remove undesirable impurities therefrom. Thereafter, the treated solution is cooled so as to precipitate the species therefrom as recycled solid polyester precursor materials. These precipitated solids may then be admixed with new polyester precursor materials to thereby produce an uncontaminated polyester product which contains said recycled polyester precursor material. Alternatively, the precipitated solids may be used to produce a 100% recycle content polyester.

Preferably, excess dihydric alcohol may be stripped from the reaction mixture before said species is dissolved in the hot solvent. Desirably, the reaction mixture may be treated to remove undesirable impurities therefrom prior to the dissolving of said species in the hot solvent. In accordance with one particular aspect of the invention, said treating of the reaction mixture may comprise straining or filtering the same. Optionally, monomer and lower molecular weight oligomers may be removed from the reaction mixture prior to the dissolving of said species in the hot solvent. Pursuant to the invention, the previously used polyester materials may preferably include either scrap or postconsumer or a mixture of scrap and postconsumer polyethylene terephthalate materials, said dihydric alcohol may preferably comprise ethylene glycol and said species may therefore include monomeric and oligomeric bis-(2-hydroxyethyl) terephthalate.

In a preferred form of the invention, the hot solvent may comprise one or more of water, an alcohol, an ether, a nitrile, a chlorinated hydrocarbon, an aromatic hydrocarbon, a ketone, or an ester. And in a particularly preferred form of the invention, the hot solvent may comprise water or one or more esters of the general formula

wherein R and R' are each selected from straight or branched chain alkyl radicals of 1 to about 12, and preferably 1 to 6 carbon atoms.

With regard to the hot solution of the invention, the same may preferably contain from about 0.5 to about 20 parts by weight of the solvent for each part by weight of the species dissolved therein.

Preferably the treating of the hot solution may comprise one or more of contacting the hot solution with an adsorbent, for example, by passing said hot solution over a bed of adsorbent, extracting said hot solution with another solvent and filtering said hot solution.

DETAILED DESCRIPTION OF THE PREFERRED EMBODIMENTS OF THE INVENTION

The present invention provides a novel process for recycling polyester materials. Objects of the invention are to provide a means for removing the wide range of contaminants that might potentially appear in the recycle polyester stream, producing a material meeting the specifications required for further processing, and doing the above in an economically viable fashion. The process comprises reacting the polyester with a glycol, producing a monomeric or oligomeric species, and purifying said monomer or oligomer that can then be introduced to a polyester production process.

The polyesters are any polyesters that are suitable for use in packaging, and particularly food packaging. Suitable polyesters are generally known in the art and may be formed from aromatic dicarboxylic acids, esters of aromatic dicarboxylic acids, glycol and mixtures thereof. More preferably the polyesters are formed from terephthalic acid, isophthalic acid, 2,6-naphthalenedicarboxylic acid, dimethyl terephthalate, dimethyl isophthalate, dimethyl-2,6-naphthalenedicarboxylate, ethylene glycol, diethylene glycol, cyclohexanedimethanol and mixtures thereof.

In the first stage of the process, the polyesters and glycol are mixed so as to provide a mole ratio of glycol to dicarboxylic acid component in the polyester between 1.1 and 10, preferably between 2 and 6. It is understood that the total moles of glycol include the glycol incorporated in the polyester. The reaction is run between 150° and 300° C., preferably between 180° and 240° C. The reaction time should be sufficient to produce an oligomeric material, usually between 10 minutes and 4 hours. The reaction may be conducted batchwise or continuously. Although the recycled polyester may contain catalysts that may be adequate to produce an oligomeric mixture at an acceptable rate, transesterification catalysts known in the art such as salts of Zn, Sb, Ti, Sn, Mn, or Ge may be added to increase the rate. Following completion of the reaction, the mixture is optionally strained or filtered to remove insoluble material.

Optionally, excess glycol may be removed from the reaction product, preferably at temperatures below 200° C. to prevent polymerization. Any stripped glycol may be recycled to the glycolysis reactor or removed from the process. Also, optionally, monomer and some lower molecular weight oligomers may be evaporated from the glycolysis products using a thin film evaporator or other suitable device. The higher molecular weight bottoms products from the evaporator may be recycled to the glycolysis reactor to undergo further depolymerization to lower molecular weight products. A purge stream to remove nonvolatile contaminants may be removed from the evaporator bottoms stream. The optional glycol and monomer evaporators may be batch or continuous. Prior to glycol or monomer evaporation, addition of a phosphorus compound or a polymerization inhibitor may be desirable.

The second stage of the process, which may be conducted continuously or batchwise, comprises dissolving the product of the first stage in from about 0.5 to about 20 parts by weight of a hot solvent selected from alcohols, ethers, nitriles, chlorinated hydrocarbons, aromatic hydrocarbons, or ketones, but in particular water or one or more esters of the general formula

wherein R and R' are each selected from straight or branched chain alkyl radicals of 1 to about 12, preferably 1 to 6 carbon atoms. It is to be understood that mixtures of the above solvents could also be employed. Optionally, the hot solution may be contacted batchwise with from 0.0001 to 2 parts of an adsorbent per part of stage 1 product or continuously over a bed of adsorbent with a empty tube residence time of 0.01 to 2 hours. Preferred adsorbents include activated carbon, activated clay, silica, and alumina or mixtures thereof. The most preferred adsorbent is activated carbon. Also optionally, the hot solution may be extracted with another solvent that is sparingly soluble in the hot solution. For example, an ester solution may be extracted with water to remove metal salts and other polar components that are more soluble in water than the organic solvent.

The hot solution is filtered to remove insoluble impurities such as pigments used in colored polyester. The filter should remove material larger than 50 microns, preferably larger than 0.01 to 1 micron. Extending the life of the filter by prefiltering with a coarse filter may be advantageous. The scope of this invention includes running the process under pressure. For example, it would be desirable when using a water solvent to operate under pressure to allow the use of higher temperatures which increase the solubility of the oligomers. The product is removed by cooling the filtered hot solution and precipitating the product, which can be removed from the solvent by means known in the art such as filtration or centrifugation. The solid product may be dried or melted and the residual solvent stripped. The filtrate may be disposed or purified by distillation and/or further adsorbent treatment for reuse in the process. Optionally, part of the solvent may recycled to the process and a side stream may be purified.

It should be clear to one skilled in the art that the second stage of the process may be repeated in whole or in part to increase the purity of the product.

EXAMPLES

EXAMPLE 1

One part of green-colored Eastman PET bottle resin was reacted with two parts of ethylene glycol in an autoclave for three hours at 240° C. The resultant green mixture was stripped of most of the excess ethylene glycol at 120° C. and 1 torr. Of the remaining solids, 64.4 grams were mixed with 254 grams of n-butyl acetate and heated to 90° C., dissolving the solids. The solution, which was green, was filtered through qualitative lab filter paper and a 0.2-micron membrane filter, leaving a blue residue on the filters. The hot solution was cooled to ambient temperature, causing solid material to precipitate out of solution. Thereafter, 82.9 grams of wet solids were filtered from the filtrate, which was yellow. 37.0 grams of the wet solids were dissolved in 121 grams of n-butyl acetate at 80° C. The solution was cooled to ambient temperature and solids, which were white, were removed by filtration. Following drying, the weight of the solid material was 11.9 grams. Of this solid, 11.4 grams were mixed with 34.2 grams of virgin BHET and polymerized at 275° C. and 0.5 torr for about 35 minutes. A control polymer was produced solely from virgin PET under the same conditions. For the polymer with recycle content, the CDM color was quite good (L*=90.8, a*=−0.8, b*=2.9), and was similar to that for the control polymer (L*=91.8, a*=−0.5, b*=2.5). Note that the green polymer has large negative a, values (a*=−37).

EXAMPLE 2

One part of postconsumer PET, which was partially comprised of green bottle polymer, was reacted with two parts of ethylene glycol at 220° C. for two hours and the resultant mixture was stripped of excess ethylene glycol at 120° C. and 1 torr. Of the obtained solid, one hundred grams were mixed with 400 grams of n-butyl acetate and the mixture was heated to 90° C., dissolving the monomer. Five grams of activated carbon were added to the mixture, which was then stirred for one hour. The solution was then filtered through a coarse filter followed by a 0.2 μm filter. Next, the solution was cooled to room temperature, whereupon the monomer crystallized from the solution. Vacuum filtration was used to separate the solid from the liquid. About 65 grams of monomer were recovered. Forty-two grams of the recycle monomer were mixed with 85 grams of virgin BHET (calculated to give 25% recycle content PET) and polymerized at 290° C. and 0.5 torr for an hour. The number average degree of polymerization of the polymer was about 100. CDM color of the polymer was L*=87.2, a*=−1.4, b*=4.5. In contrast, 25% recycle content PET was produced with unpurified monomer from the postconsumer PET. The color of this polymer was L*=78.9, a*=−13.2, b*=4.7. The monomer purification process clearly removed a large portion of the green color (since negative a, values are a measure of green); improvement in the brightness was also significant, as seen by the increase in L*. The process also did a good job of removing catalyst metals from the postconsumer PET. The PET with recycle content from purified monomer contained 1.4 ppm Co, 1.2 ppm Ti, and 0.4 ppm Mn, while the PET produced from unpurified monomer contained 10.1 ppm Co, 10.8 ppm Ti, and 4.4 ppm Mn. None of these metals were added while making the polymer.

EXAMPLE 3

PET subjected to too harsh processing conditions can become yellow. Such material was processed according to the steps outlined in Example 2. PET with 25% recycle content via the monomer purification process had a CDM color of L*=83.5, a*=−0.4, and b*=3.2. When 25% recycle content polymer was made from monomer that had not undergone purification, the color was L*=85.5, a*=−0.4, b*=5.8. The monomer purification process removed most of the yellow color, evidenced by the significant decrease in b*.

We claim:

1. A process comprising:

(A) contacting at a temperature in the range of 150° to 300° C. for a period of time in the range of 10 minutes to 4 hours previously used polyester with from 1.1 to 10 moles of dihydric alcohol per mole of dicarboxylic acid in the polyester to depolymerize the polyester and produce a reaction mixture containing monomeric, oligomeric or a mixture of monomeric and oligomeric dihydroxy species, (B) removing excess dihydric alcohol from the reaction mixture at a temperature below 200° C., (C) dissolving the reaction mixture in about 0.5 to about 20 parts by weight of a hot solvent, (D) treating the hot solution to remove undesirable impurities larger than 50 microns, (E) cooling the treated solution to precipitate the species therefrom as a solid, and (F) preparing a polyester from the precipitated species.

2. The process of claim 1 wherein the polyester is polyethylene terephthalate, the dihydric alcohol is ethylene glycol and the species includes monomeric and oligomeric bis-(2-hydroxyethyl) terephthalate.

3. The process of claim 1 wherein the hot solvent comprises one or more of water, an alcohol, an ether, a nitrile, a chlorinated hydrocarbon, an aromatic hydrocarbon, a ketone, or an ester.

4. The process of claim 3 wherein the hot solvent comprises water or one or more esters of the general formula

wherein R and R' are each selected from straight or branched chain alkyl radicals of 1 to about 12 carbon atoms.

5. The process of claim 1 wherein prior to Step (D) the hot solution is contacted with an adsorbent.

6. The process of claim 1 wherein prior to Step (D) the hot solution is contacted with another solvent to extract impurities into the other solvent.

7. The process of claim 1 wherein Step (D) comprises treating the hot solution by straining or filtering.

8. A process comprising:

(A) contacting at a temperature in the range of 180° to 240° C. for a period of time in the range of 10 minutes to 4 hours previously used polyethylene terephthalate with from 2 to 6 moles of ethylene glycol per mole of terephthalic acid in the polyethylene terephthalate to depolymerize the polyethylene terephthalate and produce a reaction mixture containing monomeric, oligomeric or a mixture of monomeric and oligomeric bis-(2-hydroxyethyl) terephthalate species, (B) removing excess ethylene glycol from the reaction mixture by stripping at a temperature below 200° C., (C) dissolving the reaction mixture in about 0.5 to about 20 parts by weight of a hot solvent comprising water or one or more esters of the general formula

wherein R and R' are each selected from straight or branched chain alkyl radicals of 1 to about 6 carbon atoms.
(D) treating the hot solution by filtration to remove undesirable impurities larger than 1 micron,
(E) cooling the treated solution to precipitate the species therefrom as a solid, and
(F) preparing a polyester from the precipitated species.
* * * * *